(12) United States Patent
Cho et al.

(10) Patent No.: US 12,331,802 B2
(45) Date of Patent: Jun. 17, 2025

(54) COMPOSITE MATERIAL

(71) Applicant: KOLON INDUSTRIES, INC., Seoul (KR)

(72) Inventors: Geun Sang Cho, Seoul (KR); Choongnyun Paul Kim, Seoul (KR); Kwan Min Choi, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 366 days.

(21) Appl. No.: 17/758,734

(22) PCT Filed: Jan. 14, 2021

(86) PCT No.: PCT/KR2021/000569
§ 371 (c)(1),
(2) Date: Jul. 13, 2022

(87) PCT Pub. No.: WO2021/145709
PCT Pub. Date: Jul. 22, 2021

(65) Prior Publication Data
US 2023/0056819 A1    Feb. 23, 2023

(30) Foreign Application Priority Data

Jan. 17, 2020  (KR) .................. 10-2020-0006342

(51) Int. Cl.
*F16D 65/12* (2006.01)
*F16D 69/02* (2006.01)

(52) U.S. Cl.
CPC ......... *F16D 65/127* (2013.01); *F16D 65/123* (2013.01); *F16D 65/125* (2013.01); *F16D 69/027* (2013.01); *F16D 2200/0008* (2013.01); *F16D 2250/0046* (2013.01)

(58) Field of Classification Search
None
See application file for complete search history.

(56) References Cited

U.S. PATENT DOCUMENTS

| | | | |
|---|---|---|---|
| 4,067,732 | A  | 1/1978  | Ray |
| 6,726,753 | B2 | 4/2004  | Koucouthakis |
| 9,004,240 | B2 | 4/2015  | Palumbo et al. |
| 2011/0048871 | A1 | 3/2011 | Meckel |

(Continued)

FOREIGN PATENT DOCUMENTS

| | | |
|---|---|---|
| CN | 100439743 C | 12/2008 |
| EP | 2558607 B1 | 8/2017 |

(Continued)

OTHER PUBLICATIONS

EP3184672B1—English Machine Translation (Year: 2017).*

*Primary Examiner* — Melanie Torres Williams
(74) *Attorney, Agent, or Firm* — Harvest IP Law, LLP

(57) ABSTRACT

A brake body according to the present disclosure has a coating layer which contains an iron-based amorphous alloy and is formed on a contact surface at which a friction means rubs against the brake body to generate braking force which the brake body is rotated. The coating layer has a low friction coefficient and thus generates less dust during braking. The coating layer also has high corrosion resistance and wear resistance and may thus guarantee high performance and good price competitiveness when applied to a brake base material produced at low cost.

13 Claims, 4 Drawing Sheets

(56) References Cited

U.S. PATENT DOCUMENTS

2014/0242405 A1    8/2014  Palumbo
2017/0016497 A1    1/2017  Haug
2019/0264039 A1*   8/2019  Sniezewski ............. C04B 41/52

FOREIGN PATENT DOCUMENTS

EP          3184672 B1 * 10/2018  ............. C25D 11/02
JP          7-278756   A   10/1995
JP         2013-221621 A   10/2013
KR         20040070448 A    8/2004

* cited by examiner

【FIG. 1】
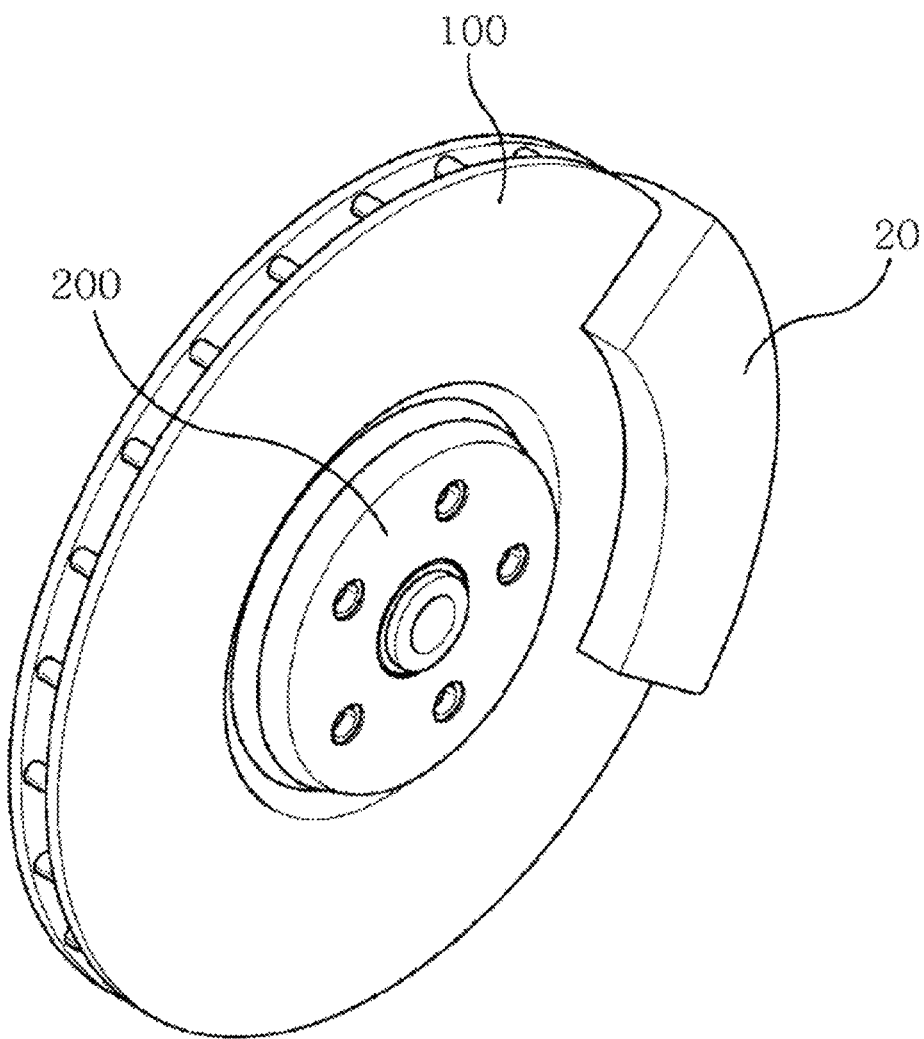

[FIG. 2]
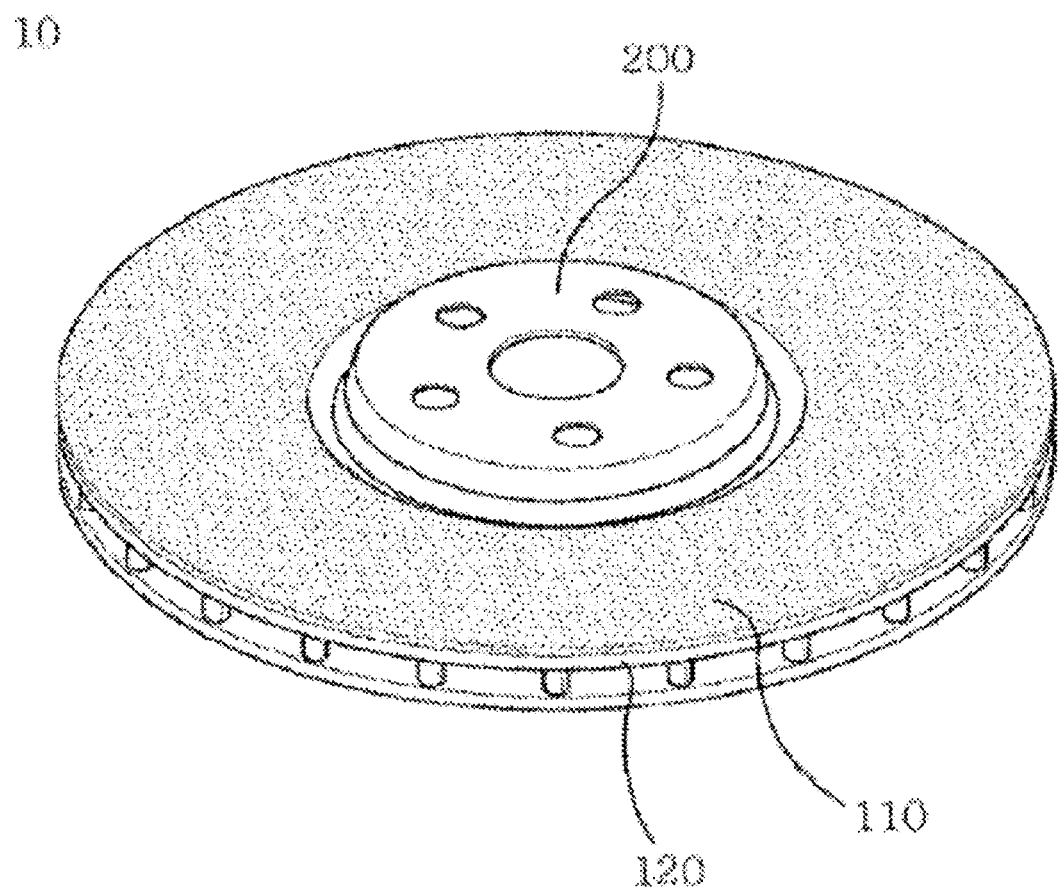

[FIG. 3]
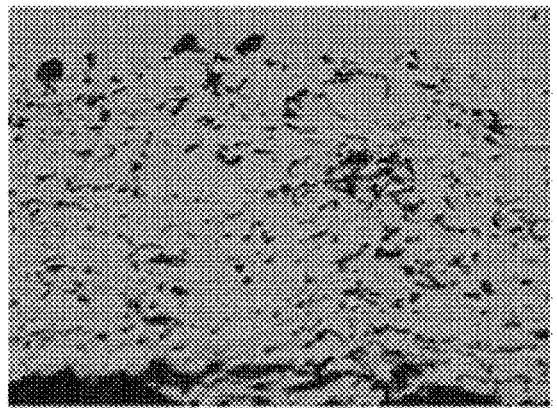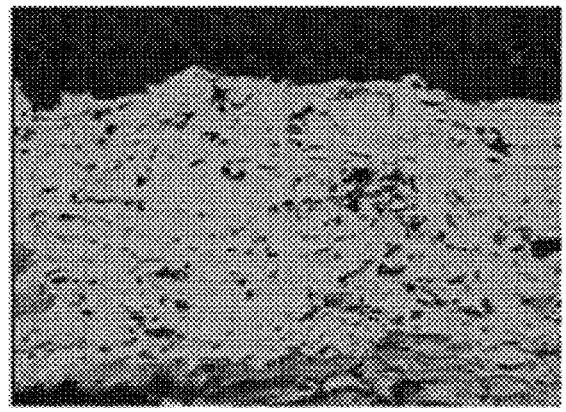
(a)
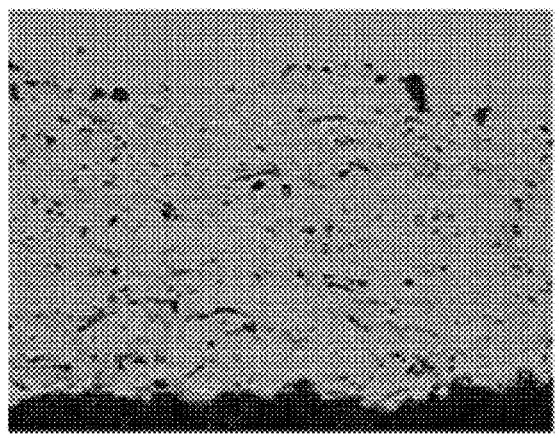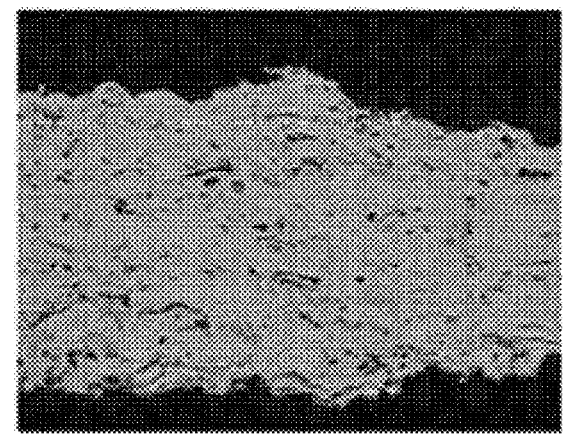
(b)
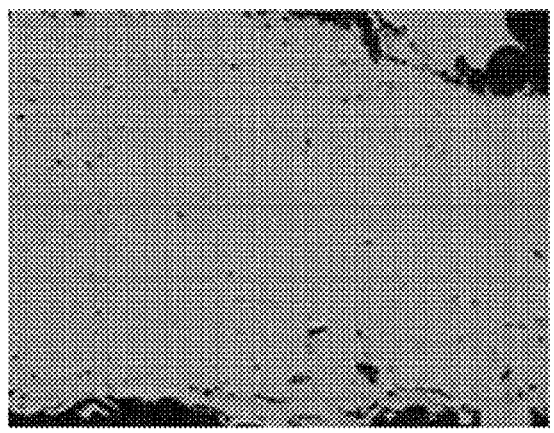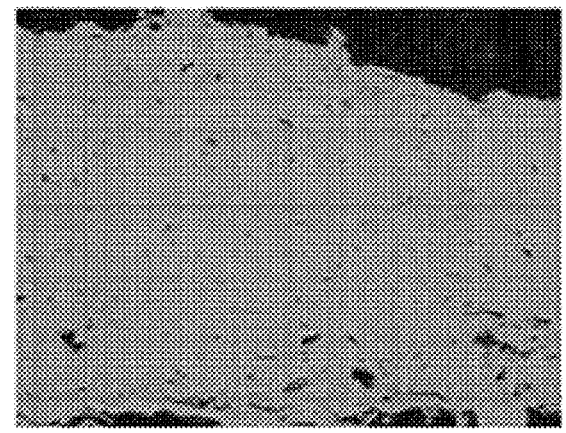
(c)

【FIG. 4】
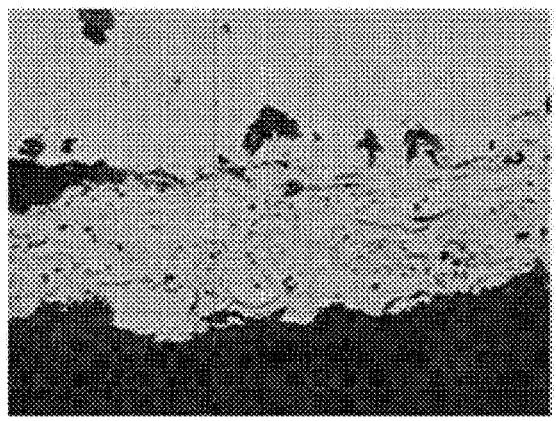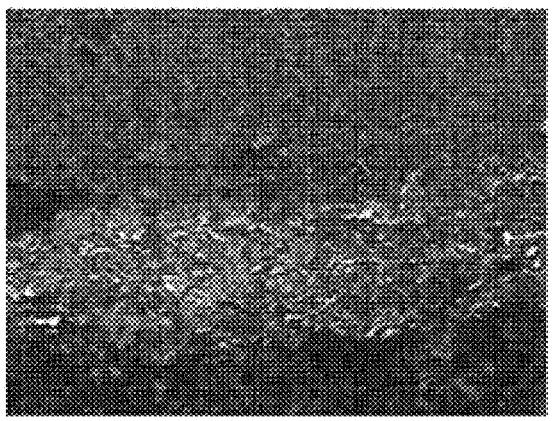
(a)
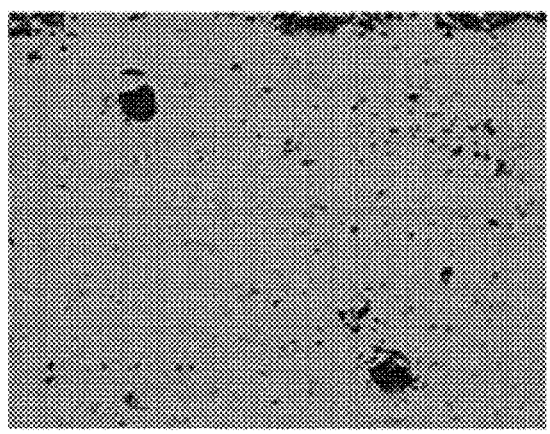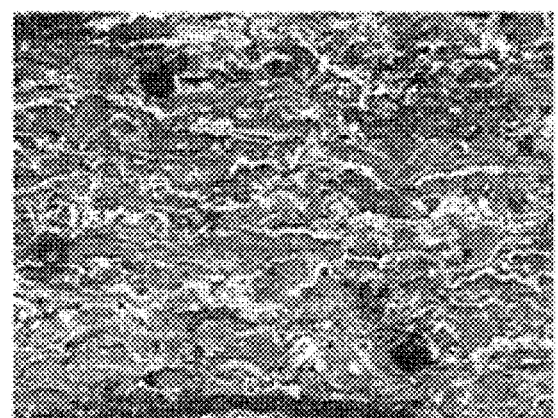
(b)
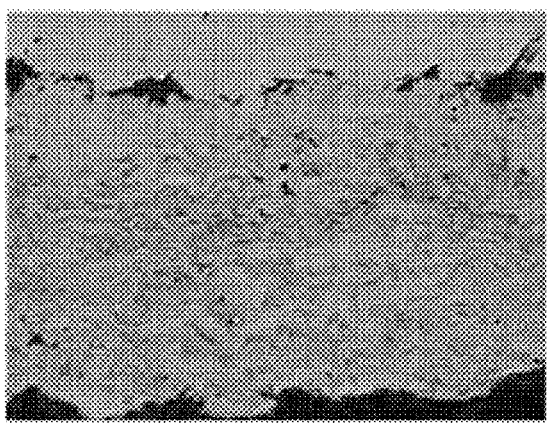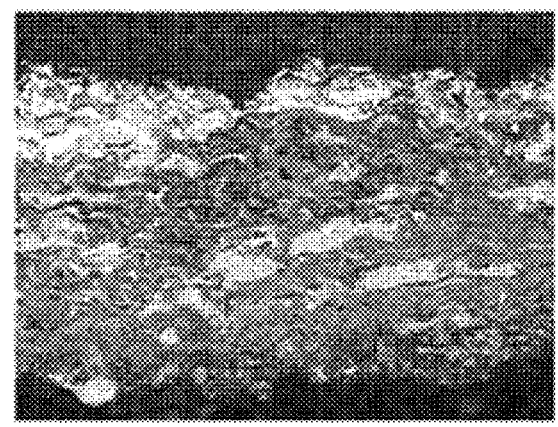
(c)

COMPOSITE MATERIAL

CROSS REFERENCE TO RELATED APPLICATIONS

This application is a National Stage of International Application No. PCT/KR2021/000569 filed Jan. 14, 2021, claiming priority based on Korean Patent Application No. 10-2020-0006342 filed on Jan. 17, 2020.

TECHNICAL FIELD

An aspect of the present disclosure relates to a brake device that may be used in a vehicle or a driving device, and a brake body included in the brake device.

BACKGROUND ART

In general, the term "brake device" is a general term for any device for regulating and controlling the operation speed of a vehicle or a mechanical device, and according to braking mechanisms, brakes devices may be roughly classified into a drum brake type and a disc brake type.

In drum-type brakes, a piston is hydraulically pressed, and then a brake shoe is pressed against a drum according to the movement of the pressed piston, thereby applying braking force. However, drum-type brakes have poor heat dissipation performance, and thus most recent vehicles use disc-type brakes having higher heat dissipation performance than drum-type brakes.

A disc-type brake includes a main body having a rotating body (disc) and a brake pad for stopping the rotation of the rotating body. Such a disc-type brake may be used in a brake device for wind power generation, a brake device for a vehicle, and a brake device for a general (construction) machine.

Brake devices used in vehicles are susceptible to problems such as corrosion, wear, and distortion that can affect the performance of the vehicles and the safety of vehicle occupants. For example, corrosion of friction surfaces may result in noise and/or vibrations during braking. Conventional cast iron brake discs are vulnerable to this corrosion problem and are relatively heavy. Brake discs that are lighter than cast iron brakes may reduce the unsprung weights of vehicles and may provide benefits such as improved vehicle handling. Accordingly, it is expected that vehicle brake discs having improved thermal, wear, and corrosion characteristics, while being lightweight, will be constantly researched and used.

As a method of improving corrosion and friction resistance and other characteristics, developing surface treatment techniques such as coating techniques for improving surface characteristics are easier and more economical than developing new materials for discs, and thus a large amount of research has been conducted into surface treatment techniques. Conventional processes for coating vehicle components include heat treatment processes (e.g., ferritic-nitro carburizing (FNC)). A heat treatment process in which cast iron brake discs are immersed in a salt bath results in a chemically modified surface having improved resistance to oxidation and corrosion. However, in such processes, components are entirely heated and quenched, and thus thermal distortion may occur. Although such processes provide coatings to the surfaces of vehicle components, thermal distortion has a negative effect on dimensional stability and in-process scrap control.

Another conventional method is to form a diffusion bond between an aluminum core and a stainless steel sheet. However, this diffusion bonding method has technical challenges and limitations associated with processes. For example, requirements for high-pressure rolling for diffusion bonding make it difficult to apply flat discs to diffusion bonding processes. Conversely, processes applicable to materials and components (for example, rotors) having arbitrary shapes may be useful. In addition, diffusion generally requires high-temperature and high-pressure conditions for a significant period of time. Time-efficient processes, in which high pressure is not required and heat is transferred to a minimal area of a base material, may be also be useful. Although these improvements are desirable, there are additional challenges associated with replacing a diffusion bonding process with another process such as a process of spraying a metal. For example, the related art teaches that metal spraying methods may not lead to satisfactory products due to separation between a metal base and a sprayed metal coating. Specifically, a sprayed metal coating may peel off in pieces and may thus worsen, for example, the integrity of stacked sheets prepared through a diffusion bonding process.

In addition, new coating methods may provide new indicators of vehicle component wear (for example, brake rotor wear). For example, a friction disc of the related art has a wear-resistant layer and an integral wear indicator, and when the wear-resistant layer is worn, an indication surface element having at least one distinguishable characteristic, color or texture may be exposed to indicate the exposure of the friction disc. However, such a brake wear indicator is not directly integrated into a brake disc and requires a long post-processing process. A new coating method providing a wear indicator directly integrated into a metal may markedly improve the efficiency of manufacturing processes.

DISCLOSURE

Technical Problem

One aspect of the present disclosure is to provide a brake body, which has improved durability against corrosion and wear, reduces the generation of dust and fine dust, has an extended lifespan, and reduces manufacturing costs for use in mass-produced vehicles, and a brake device including the brake body.

Technical Solution

According to an aspect of the present disclosure, a brake body for a brake device includes: a coupling part which is to be connected to a drive shaft; and a brake part including a rotor connected to an outer peripheral surface of the coupling part, and a coating layer provided on a surface of the rotor, wherein the coating layer includes an amorphous alloy and has a thermal expansion coefficient 1.0 times to 1.4 times a thermal expansion coefficient of the rotor.

In this case, the amorphous alloy may include:
Fe;
a first component including at least one selected from the group consisting of Cr, Mo, and Co; and
a second component including at least one selected from the group consisting of B, C, Si, and Nb.

The rotor may include an iron-based alloy.

The coating layer may have an average friction coefficient of 0.001 to 0.08 when measured under a condition of 100 N. The coating layer may have a Vickers hardness of 700 Hv to 1,200 Hv.

The coating layer may have a porosity of 0.1% to 1.0%.

The coating layer may have a thickness of 50 μm to 400 μm.

The coating layer may be provided by spraying iron-based amorphous alloy powder onto the surface of the rotor.

The rotor may be shaped like a disc, and the coating layer may be provided on at least one surface of the disc.

The rotor may have a drum shape, and the coating layer may be provided on an inner peripheral surface of the rotor.

According to another aspect of the present disclosure, there is provided a brake device for braking a machine which includes a drive shaft and is driven, the brake device including:
- a brake body including a coupling part coupled to the drive shaft and rotated when driven, and a brake part connected to an outer peripheral surface of the couplingpart; and
- a friction means that is displaced toward the brake body, brought into contact with the brake body, and contacted with the brake part for braking,
- wherein the brake part includes a rotor connected to the coupling part and a coating layer provided on a surface of the rotor, wherein a thermal expansion coefficient of the coating layer is 1.0 times to 1.4 times a thermal expansion coefficient of the rotor, and the coating layer includes an amorphous alloy.

In this case, the amorphous alloy may include:

Fe;

a first component including at least one selected from the group consisting of Cr, Mo, and Co; and a second component including at least one selected from the group consisting of B, C, Si, and Nb.

The rotor may include an iron-based alloy.

The rotor may have a disc shape, and the coating layer may be provided on at least one surface of the rotor.

The rotor may have a drum shape, and the coating layer may be provided on an inner peripheral surface of the rotor.

Advantageous Effects

According to an embodiment of the present disclosure, a brake body has an amorphous alloy coating layer that is formed on a brake part on which friction occurs during braking to guarantee a low coefficient of surface friction compared to conventional brake bodies, thereby preventing generation of large amounts of dust and fine dust during braking and improving the lifespan of the brake body owing to improved wear and corrosion resistance of the coating layer.

In addition, when a brake body having a coating layer containing an amorphous alloy is fabricated, the brake body may use a mass-produced rotor as a base material, and thus a high-quality brake disc may be produced with low manufacturing costs, thereby enhancing price competitiveness.

In addition, according to an embodiment of the present disclosure, an iron-based brake body rotor is used as a base material, and a coating layer is formed of an amorphous alloy having the same composition as the base material. Thus, the base material and the coating layer may have similar thermal expansion coefficients the ratio of which ranges from 1 to 1.4, thereby reducing separation or defects caused by friction heat and improving the adhesion between the coating layer and the surface of the base material.

In addition, a separate intermediate layer or bonding layer is not required when forming the coating layer, processing and production costs may be reduced.

DESCRIPTION OF DRAWINGS

FIG. 1 is a view schematically showing a brake device according to an embodiment of the present disclosure.

FIG. 2 is a view schematically showing a brake body of the brake device according to an embodiment of the present disclosure.

FIGS. 3A to 3C and FIGS. 4A to 4C are images showing changes in coating layers of examples of the present disclosure and comparative examples before and after a corrosion resistance test.

BEST MODE

In the following detailed description of the present disclosure, it should be understood that terms used herein are for the purpose of describing specific embodiments and are not intended to limit the scope of the present disclosure defined only by the appended claims. All technical and scientific terms used herein have the same meanings as commonly understood by those of ordinary skill in the art, unless otherwise stated.

1) Since shapes, sizes, percentages, angles, numbers, etc. are roughly illustrated in the accompanying drawings, some variations thereof are allowed. 2) Since the drawings are drafted from an observer's perspective, the direction or position for describe the drawings may be variously changed according to the observer's position. 3) The same reference numerals will be used for the same parts even in different drawings.

4) The terms "comprise," "have," "composed of," etc. may be interpreted as allowing the addition of any other part unless the word "only" is used together with the terms. 5) Any element used in a singular form may also be interpreted to indicate plural forms. 6) Although shapes, comparisons in size, position relations, etc. are not described with "about," "substantially," etc., they may be interpreted to cover a general scope of tolerance.

7) Although the terms "after ~," "before ~," "subsequently," "following," "this time," etc., are used, the terms are not intended to limit a temporal order. 8) The terms "first," "second," "third," etc. are used selectively, interchangeably, or repeatedly for only ease of distinguishment, and are not interpreted as a limited meaning.

9) Where a position relation between two parts is described with "on ~," "above ~," "below ~," "beside ~," "on a side ~," "between ~," etc., there may be at least one other part between the two parts unless they are used with "directly."

10) The expression "a part 'or' another part is electrically connected to something" may be interpreted to cover any combination of the parts as well as one of the parts, and the expression "'one of' a part 'or' another part is electrically connected to something" may be interpreted that either the part or the other part is electrically connected to something.

In the present specification, the term "amorphous" may have a meaning including "non-crystalline" or "amorphous phase" and may refer to a phase of a solid in which crystals are not formed, that is, a phase that does not have a regular structure.

Furthermore, in the present specification, the term "iron-based amorphous alloy powder" refers to a powdery alloy which includes iron the most by weight and in which an amorphous phase is substantially the most phase.

According to an aspect of the present disclosure, a brake body 10 includes: a coupling part 200 that is to be coupled to a rotating shaft or a drive shaft to which a wheel of a device or machine is coupled; and a brake part 100 coupled to the outer peripheral surface of the coupling part 200, wherein the coupling part 200 substantially connects the brake part to the rotating shaft or the drive shaft.

The shape of the brake body 10 may vary depending on the type of a device in which the brake body 10 is used or the type and mechanism of a brake device. For example, the brake body 10 may have a shape having rotational symmetry with respect to a central axis, such as a disc shape or a drum shape. Preferably, the brake body 10 may be of a disc or drum type.

FIG. 1 is a view illustrating the exterior of a brake device including a brake disc which is a disc-type example of the brake body 10. FIG. 2 is a view illustrating the brake body 10 according to an aspect of the present disclosure.

The brake disc, which is an example of the brake body 10, is provided in a machine or vehicle, such as an automobile, a prime mover, and any other mechanical device, which is operated using a drive shaft or an axle shaft (rotating shaft).

The brake body 10 is rotated together with the drive shaft or the axle shaft, and when the brake device is operated, a friction means 20 of the brake device may rub against the surface of the brake body 10 which is being rotated. At this time, the brake body 10 receives resistance due to friction and loses rotational kinetic energy, and thus the rotation speed of the brake body 10 reduces, thereby performing braking.

The coupling part 200 of the brake body 10, which is also called a hub, is a part connected to a drive shaft or an axle shaft of a wheel to rotate the brake body 10. As the coupling part 200 is coupled and connected to the drive shaft or axle shaft, rotational kinetic energy generated by an engine of a vehicle and transmitted to the wheel may be transmitted to the brake body 10.

The coupling part 200 includes: a main body having fastening holes to which fastening means such as screws may be coupled for coupling with the drive shaft or axle shaft; and a hat-part connected to the main body and protruding from one side of the main body.

The coupling part 200 of the brake body 10 has a circular outer peripheral surface, and the size of the coupling part 200 is not limited. The size of the coupling part 200 may be determined depending on the size of the brake device or the size of an apparatus or a vehicle in which the brake device is used.

The brake part 100, coupled to the outer peripheral surface of the coupling part 200 in the brake body 10, may include: a rotor connected to the outer peripheral surface of the coupling part 200 and connected to be rotated together with a drive shaft or an axle shaft; and a coating layer 110 provided on the surface of the rotor 120.

Here, the rotor 120 is a component that rotates by receiving rotational kinetic energy which is transmitted to the brake body 10 from the drive shaft or axle shaft. In general, the rotor 120 may be of a ring or drum type including an inner through-hole and constituting the exterior of the brake body 10.

According to an embodiment of the present disclosure, the brake body 10 may be of a disc type as shown in FIG. 2, and the rotor 120 may be a ring-shape plate including an inner through-hole such that a circular inner peripheral surface of the inner through-hole of the rotor 120 may be coupled to the outer peripheral surface of the coupling part 200.

Although not specifically shown in the drawings, the inner peripheral surface of the rotor 120 and the outer peripheral surface of the coupling part 200 may be integrally connected to each other in the rotor 120 of the brake part 100. In addition, the rotor 120 and the coupling part 200 may be connected to each other using one or more strut structures to form a connection structure in which a recessed part or a hole is formed between the outer peripheral surface of the coupling part 200 and the inner peripheral surface of the rotor 120.

The brake part 100 may include the rotor 120 having a disc or drum shape, and the coating layer 110 provided on the surface of the rotor 120, and as shown in FIG. 2, the coating layer 110 may be provided on the surface of the rotor 120 having a disc shape.

Here, the material of the rotor 120 is not particularly limited, but may be formed of an iron-based alloy, an aluminum alloy, or a ceramic material that may be produced at low cost. Preferably, an iron-based metal such as cast iron or gray cast iron may be used. When the rotor 120 includes an iron-based alloy, the rotor 120 may have price competitiveness and may be manufactured to satisfy standards or specifications such as run-out and DTV specifications for the brake body 10 which are generally required for use in a brake device.

Since the brake part 100 includes the coating layer 110 provided on the surface of the rotor 120, the performance of the brake body 10 may be markedly affected by the surface characteristics of the coating layer 110 formed on the surface of the brake part 100, and the relationship between materials of the brake part 100 and the coating layer 110. Specifically, the performance of the brake device or the generation of fine dust may vary depending on the surface friction coefficient and roughness of the coating layer 110. The lifespan of the brake device may vary depending on the relationship between the coating layer 110 and the brake part 100, such as thermal conductivity, thermal expansion coefficient, and bonding strength.

The main friction region of the brake body 10 in which friction mainly occurs may vary depending on the structure, type, and braking method of the brake device, and a brake structure in which friction mainly occurs on at least a partial surface of the brake part 100 or on a partial surface of the brake part 100 and a partial surface of the coupling part 200 during a braking operation may be included in the brake body 10 of the present disclosure.

Hereinafter, a brake disc on which braking occurs by friction of the brake part 100 will be described through examples, but the present disclosure is not limited thereto. For example, the brake body 10 may be configured such that the coating layer 110 may also be provided on a partial surface of the coupling part 200 or friction may occur on a partial surface of the coupling part 200, and this example may also be within the scope of the present disclosure.

The rotor 120 of the brake part 100 may further include holes or concave-convex parts for cooling between both sides thereof to prevent a vapor lock phenomenon in which a brake fluid boils and bubbles due to a high brake temperature. For example, when the rotor 120 is of a disc type, a ventilated (perforated) disc having a plurality of holes formed through both sides thereof may be used as the rotor 120.

The coating layer 110 provided on the surface of the rotor 120 may improve the surface characteristics of the brake part 100 of the brake body 10. In more detail, the coating layer 110 may increase the surface hardness, the wear resistance, and the corrosion resistance, and the brake disc lifespan of the brake part 100, and may decrease the surface friction coefficient of the brake part 100 such that the generation of dust and fine dust may be advantageously reduced during braking.

The coating layer 110 may be provided on one surface or both surfaces of the rotor 120 of the brake part 100, and the positions, number, total area of surfaces of the rotor 120 coated with the coating layer 110 may vary depending on the type and operation of the brake device.

When the rotor 120 is of a disc type, the coating layer 110 may be provided on at least one surface of the rotor 120, and when the rotor 120 is of a cylindrical drum type, the coating layer 110 may be provided in at least one region of the inner peripheral surface of the rotor 120.

The reason for this is as following. When the rotor 120 of the brake body 10 is of a disc type, it is preferable that the friction means 20 of the brake device is provided on one or both sides of the brake body 10 from the outside of the brake body 10, and when the rotor 120 of the brake body 10 is of a drum type, it is preferable that the friction means 20 of the brake device is provided inside the rotor 120.

Although the thickness of the coating layer 110 may vary depending on the composition of the coating layer 110 and coating conditions, the thickness of the coating layer 110 be 50 µm to 400 µm, and preferably 100 µm to 300 µm.

If the thickness of the coating layer 110 is less than the range mentioned above, the effect of forming the coating layer 110 may be insufficient, or the coating layer 110 may have a short lifespan.

The coating layer 110 may be an amorphous alloy coating layer including an amorphous alloy having an amorphous phase. The amorphous alloy constituting the amorphous alloy coating layer 110 may preferably be an iron-based amorphous alloy including Fe.

The composition of the iron-based amorphous alloy includes: Fe as a main component; a first component including at least one selected from the group consisting of Cr, Co, and Mo; and a second component including at least one selected from the group consisting of B, C, Si, and Nb. In this case, it may be preferable that the second component may include at least two of B, C, Si, and Nb.

More specifically, based on 100 parts by weight of Fe included in the iron-based alloy, the iron-based alloy may include the first component in an amount of 30 to 140 parts by weight, preferably 35 to 100 parts by weight, and more preferably 40 to 92 parts by weight.

Among Cr, Mo, and Co, which may be included in the first component, the first component of the iron-based alloy may essentially include Cr and may include Mo in an amount of 18.0 parts by weight or less and preferably 10.0 parts by weight or less based on 100 parts by weight of Fe.

In addition, when the iron-based alloy includes Cr, the content of Cr may be 3 times or more and preferably 4 times or more the content of Mo. This may apply to the case in which Mo is not included in the first component.

When the content of Mo in the iron-based alloy satisfies the above-mentioned range in parts by weight, and the ratio of the contents of Cr and Mo satisfies the range mentioned above, the glass forming ability of the iron-based alloy may be improved such that the alloy coating layer 110 may mainly have an amorphous phase and may have improved wear resistance.

The iron-based alloy may include 4 to 20 parts by weight of the second component and preferably 5 to 19 parts by weight of the second component, based on 100 parts by weight of Fe.

In this case, the second component of the iron-based alloy may include at least two of B, C, Si and Nb. Preferably, the second component may include Si or Nb, or both Si and Nb. That is, the second component may include Si and/or Nb. When the second component of the iron-based alloy includes Si or Nb, or both Si and Nb, each of Si and Nb may be included in an amount of 9 parts by weight or less, preferably 1.5 to 8.0 parts by weight, and more preferably 2.0 to 6.0 parts by weight.

When the second component of the iron-based alloy includes Si or Nb, or both SI and Nb, and each of Si and Nb is included in the above-mentioned amount in parts by weight, the glass forming ability of the iron-based alloy may be improved such that the coating layer 110 may mainly have an amorphous phase and may have improved wear resistance.

In addition, according to the present disclosure, a third component including at least one selected from the group consisting of W, Y, Mn, Al, Zr, Ni, Sc, and P may be further included.

In this case, the total content of the third component may be less than 1.125 parts by weight, preferably 1.0 parts by weight or less, and more preferably 0.083 parts by weight or less, based on 100 parts by weight of Fe.

In addition, the third component may preferably be included in an amount of 0.9 parts by weight or less and preferably 0.05 parts by weight or less, based on 100 parts by weight of Fe. If the content of third component is greater than the range mentioned above, the glass forming ability is remarkably reduced.

When the iron-based alloy includes the first component and the second component within the ranges mentioned above or the first to third components within the ranges mentioned above and thus has a composition resulting a good glass forming ability, the iron-based alloy may be used as the amorphous alloy of the present disclosure. When the contents (in parts by weight) of the first to third components are outside the above-mentioned ranges, the glass forming ability of the iron-based alloy may deteriorate, causing problems such as deterioration of mechanical surface characteristics or an increase in friction coefficient.

It is considered that the glass forming ability of the iron-based alloy varies depending on the atomic sizes, packing ratio, deep eutectic, and reaction entropies of the elements of the iron-based alloy.

Iron (Fe), which is included as a main component in the amorphous alloy of the amorphous alloy coating layer 110, may also be included in a material of the rotor 120 on which the amorphous alloy coating layer 110 is provided. Specifically, when cast iron or an iron-based alloy which has a high Fe content is used as a material of the rotor 120, the rotor 120 and the amorphous alloy coating layer 110 may have similar thermal expansion coefficients, and thus, the amorphous alloy coating layer 110 may not be separated or damaged at the interface with the rotor 120 by large temperature variations caused by friction during the operation of the brake device.

In this case, the thermal expansion coefficient (A) of the amorphous alloy included in the amorphous alloy coating layer 110 is similar to the thermal expansion coefficient (B) of the rotor 120 of the brake part 100, and the ratio A/B may be within the range of 1.0 to 1.4, preferably within the range of 1.0 to 1.3, and more preferably within the range of 1.2 to 1.25.

When the ratio of the thermal expansion coefficients is less than or greater than the range mentioned above, the difference between the thermal expansion coefficients of the brake part 100 and the coating layer 110 is large, and thus problems such as weak coupling between the coating layer 110 and a base material or a decrease in the lifespan of the coating layer 110 may occur because of frequent temperature variations caused by frictional heat during braking.

Due to the small difference between the thermal expansion coefficients of the brake part 100 and the coating layer 110, the brake body 10 may need a bonding layer or an intermediate layer between the rotor 120 and the coating layer 110 when the coating layer is formed, and the coating layer 110, and the coating layer 110 having a uniform thickness and characteristics may be directly formed on the surface of the rotor 120 of the brake body 10 without a heat treatment process.

Owing to this, when the coating layer 110 is formed on the rotor 120 of the brake body 10, the coating layer 110 may be directly formed on the brake part 100 without requiring an addition bonding layer or primer layer as an essential layer, thereby simplifying coating and manufacturing processes and reducing manufacturing costs.

In addition, braking force may be applied to the surface of the coating layer 110 due to friction during a braking operation. During a braking operation, braking force may be generated while rotational kinetic energy of the brake body 10 is converted into thermal energy due to friction.

In this case, the surface friction coefficient of the coating layer 110 may be 0.001μ to 0.08μ and preferably 0.001μ to 0.05μ under a load of 100N, and may be 0.06μ to 0.12μ and preferably 0.06μ to 0.10μ under a load of 1,000N.

If the surface friction coefficient of the coating layer 110 is greater than the range mentioned above, generation of fine dust and heat may increase due to friction during a braking operation, and if the surface friction coefficient of the coating layer 110 is less than the range mentioned above, the braking performance of the brake device may decrease.

In addition, although the surface roughness of the coating layer 110 may vary depending on the material and performance of the friction means 20 such as brake pads of the brake device, the arithmetic mean roughness (Ra) of the coating layer 110 may be within the range of 0.03 to 0.5, and preferably within the range of 0.3 to 0.4.

If the arithmetic mean roughness (hereinafter, roughness) of the coating layer 110 is less than the range mentioned above, the surface friction coefficient of the coating layer 110 may decrease, or sufficient frictional force may not be obtained. If the roughness of the coating layer 110 is greater than the range mentioned above, surface wear and generation of fine dust may increase.

When the coating layer 110 is formed of an iron-based amorphous alloy, the method of forming the coating layer 110 is not limited, but the coating layer may be formed by a coating method using an amorphous alloy powder having the same composition as the iron-based amorphous alloy may be used.

In addition, according to an embodiment of the present disclosure, the surface of the coating layer 110 may be processed by shot peening to adjust the friction coefficient or roughness of the coating layer 110 to be within a proper range and improve the wear resistance and fatigue toughness of the coating layer 110 by compressive stress.

When the coating layer 110 is formed by a spray coating method, an iron-based amorphous alloy powder may be used. The iron-based amorphous alloy powder may be obtained from an alloy by an atomizing method, and the fraction of an amorphous phase in the iron-based amorphous alloy powder is high within the range of 90% or more, and preferably within the range of 95% or more, 97% or more, 99% or more, or 99.9% or more, and substantially 100%. That is, the iron-based amorphous alloy powder having a high amorphous phase fraction as described above may be prepared according to a cooling rate.

The alloy for iron-based amorphous alloy coating may be fabricated in various forms, preferably in a powder form, and powder having high sphericity may be preferably used as amorphous alloy powder.

The iron-based amorphous alloy powder may be prepared to have a target composition which is the same as the composition of the coating layer 110, and alloy powder having the same composition as the composition of the coating layer 110 may be used.

When the alloy powder is prepared, a raw material having a weight calculated according to the target composition may be fed and melted to prepare a composition, and at this time, there may be a slight difference between the target composition and the actual composition due to the purity of the raw material, evaporation of some elements during melting, etc. However, if the target composition or the actual composition is included within the range of the alloy composition of the present disclosure, the target composition or the actual composition is considered to be the same as the composition of the coating layer 110 or the alloy powder of the present disclosure.

The iron-based amorphous alloy powder according to embodiments of the present disclosure has good characteristics such as density, strength, wear resistance, friction resistance, and corrosion resistance owing to a high amorphous phase fraction.

The iron-based amorphous alloy powder prepared according to an embodiment of the present disclosure may have, but is not limited to, an average particle size of 1 μm to 150 μm, and the particle size of the iron-based amorphous alloy powder may be adjusted by sieving according to uses.

For example, when it is intended to perform a spray coating process using the iron-based amorphous alloy powder, the particle size of the iron-based amorphous alloy powder may be adjusted by sieving to be within the range of 15 μm to 45 μm, and when it is intended to perform an MIM (powder injection) process using the iron-based amorphous alloy powder, the particle size of the iron-based amorphous alloy powder may be adjusted by sieving to be within the range of 20 μm or less.

The iron-based amorphous alloy powder maintains the above-described amorphous fraction even when the iron-based amorphous alloy powder is melted again or exposed to high temperature and is then cooled again to solid. In this case, the amorphous fraction (a) of the iron-based amorphous alloy powder manufactured by an atomizing method and the amorphous fraction (b) of an alloy made by melting the iron-based amorphous alloy powder at a temperature equal to or greater than the melting point of the alloy and then re-cooling the iron-based amorphous alloy powder may satisfy the following condition.

$$0.9 \leq b/a \leq 1 \quad \text{[Condition 1]}$$

Here, examples of the method of manufacturing the alloy by melting the iron-based amorphous alloy powder to a temperature above the melting point of the alloy and then re-cooling the melted iron-based amorphous alloy powder, which may be used to derive b, may include a spray coating method, a 3D printing method, a metallurgy method, and the like which are common casting methods.

In addition, the b/a ratio in Condition 1 may be preferably within the range of 0.95 to 1, more preferably within the range of 0.98 to 1, and even more preferably within the range of 0.99 to 1.

Furthermore, before forming the coating layer 110, a surface treatment process may be performed on the rotor 120 of the brake body 10 for tidying up the surface of the rotor 120 or uniform coupling between the rotor 120 and the coating layer 110.

As a method of forming the coating layer 110, any coating method such as a spray coating method or a laser cladding method that a person skilled in the art could use to form an amorphous alloy coating layer having a uniform composition and thickness may be used. For example, the iron-based amorphous alloy powder may be used in a thermal spray coating process to form an amorphous coating layer 110 on the rotor 120.

Spray coating refers to a method of heating a metal or a metal compound to form a fine volumetric shape and spraying fine droplets of the metal or the metal compound onto the surface of a workpiece, and examples of spray coating include high velocity oxygen fuel (HVOF) spray coating, plasma spray coating, laser cladding spray coating, general flame spray coating, diffusion spray coating, cold spray coating, vacuum plasma spray (VPS) coating, low-pressure plasma spray (LPPS) coating, and the like.

Since the iron-based amorphous alloy powder according to an embodiment of the present disclosure has a good glass forming ability such that an amorphous phase may be formed even when a very high cooling rate is not secured. Therefore, even when the iron-based amorphous alloy powder is used to form the coating layer 110, the amorphous phase fraction of the coating layer 110 does not decrease.

That is, when the iron-based amorphous alloy powder of the present disclosure having an amorphous phase fraction of 90% or more, 99% or more, 99.9% or more, or substantially 100% is used to form a coating by spray coating, the coating may have very good characteristics because the coating has an amorphous phase volume fraction of 90% or more, 95% or more, 99% or more, 99.9% or more, or substantially 100% with respect to the entire structure.

In particular, when an HVOF spray coating process is performed using the alloy powder of the present disclosure, the amorphous phase fraction is substantially maintained, and thus physical properties may be maximally improved.

In addition, according to an embodiment of the present disclosure, the iron-based amorphous alloy powder has a very high density (coating density) on the level of 98% to 99.9% when measured, and thus the penetration of corrosives through pores may be suppressed.

The particle size of the alloy powder used for spray coating may be within the range of 10 μm to 100 μm, and preferably within the range of 15 μm to 55 μm. If the particle size of the alloy powder is less than 10 μm, there is a risk of decreasing work efficiency because small particles may adhere to a spray coating gun during a spray coating process, and if the particle size of the alloy powder exceeds 100 μm, coating productivity and efficiency may decrease because the alloy powder may not completely melt and collide with a base member (that is, the alloy powder may fall to the floor instead of forming a coating layer).

In addition, the Vickers hardness (Hv 0.2) of the coating layer 110 including the iron-based amorphous alloy may be 700 to 1,200 and preferably 800 to 1,000. The friction coefficient (friction resistance) of the coating layer 110 including the iron-based amorphous alloy may be 0.001μ to 0.08μ and preferably 0.05μ or less under a load of 100 N, and may be 0.06μ to 0.12μ and preferably 0.10μ or less under a load of 1,000 N.

In particular, compared to conventional coating layers, the coating layer 110 formed by an HVOF spray coating process has substantially no pores in a cross-section thereof, and may thus have maximal density (full density), and even when the coating layer 110 has pores, the coating layer 110 may have a porosity of only about 0.1% to 1.0%.

That is, when an HVOF spray coating is performed, a structure in which multiple paths are accumulated is formed on a base material. Specifically, oxides (black) are accumulated in each layer, and a plurality of layers having a wave form are stacked. In general, such a structure deteriorates or worsen the properties of coating layers. However, the coating layer 110 of the present disclosure may have fewer pores and a thinner oxide film and thus may have ultra-high density such that the performance of the coating layer 100 may be improved.

When the coating layer 110 is formed by a spray coating method, the adhesion between the coating layer 110 and the rotor 120 of the brake part 100 is strong. That is, the coating layer 110 may have good adhesion without an additional heat treatment process.

According to an embodiment of the present disclosure, the amorphous alloy layer 110 is directly formed on the rotor 120 of the brake part 100 of the brake body 10 without having to form a bonding layer or intermediate layer, In the brake body 10 according to an embodiment of the present disclosure, the amorphous alloy coating layer 110 is formed directly on the surface of the brake part 100 rotor 120 without forming a bonding layer or an intermediate layer, and thus the brake part 100 in which the coating layer 110 is provided on the rotor 120 may be obtained through a single process without an additional process of forming a bonding layer or an intermediate layer before forming the coating layer 110, thereby having a positive effect on productivity and price competitiveness.

In addition, the coating layer 110 is formed on the surface of the rotor 120 of the brake body 10 by forming a first coating layer (not shown) directly on the surface of the rotor 120 and then additionally forming a second coating layer on the surface of the first coating layer (not shown).

The second coating layer may be formed of an amorphous alloy having the same composition as the first coating layer, and the first and second coating layers may be formed by different methods to have different amorphous phase fractions and different porosities.

When the amorphous phase fractions of the first and second coating layers are different from each other, it is preferable that the amorphous phase fraction of the second coating layer exposed to the external environment is higher than the amorphous phase fraction of the first coating layer. The porosities of the first and second coating layers may vary depending on the coating methods. However, it is preferable that the porosities of the first and second coating layers are low, and the porosity of the second coating layer is equal to or less than the porosity of the first coating layer.

In addition, the coating layer 110 of the present disclosure may be formed in a partial region of the surface of the brake body 10. The coating layer 110 may be formed on a partial surface of the rotor 120 of the brake body 10 in a region in which the rotor 120 makes contact with the friction means 20 while rotating. That is, the coating layer 110 may be partially formed in a region making contact with the friction means 20 of the brake device.

For example, when the coating layer 110 is provided in a partial region on the surface of the rotor 120 of the brake body 10, the surface of the brake part 100 may not be smooth depending on whether the coating layer 110 is formed.

In order to flatten the entire surface of the brake part 100, the rotor 120 may be previously fabricated to have an uneven shape or a pattern such that an area of the rotor 120 in which the coating layer 110 is to be formed during the manufacture of the rotor 120 may be recessed or concave from an area of the rotor 120 in which the coating layer 110 is not formed.

In addition, the brake body 10 may be manufactured while adjusting the thickness of the coating layer 110 such that the surface of the brake part 100 may have concave-convex parts according to the shape of the coating layer 110.

When the coating layer 110 has a specific pattern on some parts of the surface of the rotor 120, concave-convex parts may be formed on the surface of the rotor 120. Owing to the concave-convex parts, frictional heat may be efficiently dissipated from the surface of the rotor 120, and thus the lifespan of the brake body 10 may be increased.

For example, the coating layer 110 formed on the surface of the rotor 120 may be patterned such that inner and outer peripheral surfaces around the center of the coating layer 110 may form annular regions which are concentric around the rotation axis of the brake body 10. In this case, the patterned coating layer 110 may have one or more unconnected regions.

In another example, the coating layer 110 may be patterned such that a plurality of figures having rotational symmetry may be repeated while extending radially from the rotation axis of the brake body 10. In this case, the shape of each figure is not limited, but the figures may preferably have the same shape and regular intervals therebetween. For example, the figures may each have a radial or spiral shape radiating in a radial or spiral direction.

When the coating layer 110 is provided in a part of the surface of the rotor 120, friction may occur on the brake body 10 both in a region in which the coating layer 110 is provided and a region in which the coating layer 110 is not provided With respect to the rotating brake body 10, friction may occur at the same time in the area where the coating layer 110 is formed and the area where it is not formed, and the effect of forming concave-convex surface partsor increasing surface roughness may be obtained depending on the thickness of the coating layer 110 and the surface structure of the rotor 120 of the brake body 10. Thus, patterns imparting various surface structures to the rotor 120 and the brake part 100 may be used.

[Mode for Invention]

Another aspect of the present disclosure provides a brake device including the brake body 10 described above and used to brake a machine or the like which is driven through a drive shaft thereof. As shown in FIG. 1, the brake device includes the brake body 10 and the friction means 20.

The friction means 20 is displaced toward the brake body 10 by receiving a force or signal during braking. At this time, the surface of the brake part 100 of the brake body 10 which is being rotated comes into contact with the friction means 20 by the displacement of the friction means 20, thereby generating friction and applying braking force to the machine which is being driven.

The brake device may include one or more friction means 20, and the friction means 20 may be brought into contact with one side or both sides of the brake body 10. For example, the friction means 20 may be provided respectively on both sides of the brake body 10 and may be simultaneously displaced toward the brake body 10 for contact with the brake part 100 of the brake body 10.

The friction means 20 may be displaced and contacted with at least one surface of the brake part 100 of the brake body 10, and then braking may occur as the rotational kinetic energy of the brake body 10 is converted into thermal energy due to friction.

The shape, structure, and number of the friction means 20 may vary depending on the type and shape of the brake device. For example, when the brake device is of a disc brake type, one or more brake pads may be used as the friction means 20.

In this case, the brake pads may be respectively coupled to a pair of slidable backplates, and the pair of brake pads may face each other with a brake disc therebetween.

The material of the brake pads is not limited. For example, an organic material, a non-steel material, a low-steel material, a steel-based material, a ceramic, a resin, a semi-metallic material, or the like, which does not contain asbestos, may be used.

The brake device may further include other components in addition to the brake body 10 and the friction means 20. In the present specification, however, descriptions of components other than the brake body 10 and the friction means 20 are omitted. Components considered to be included in a general brake system based on common technical knowledge may be included in the brake device according to the aspect of the present disclosure.

EXAMPLE

Examples 1 to 8: Fabrication of Brake Bodies Using Iron-Based Amorphous Alloy Powder Particles Materials having components and compositions (weight ratio) shown in Table 1 below were supplied into an atomizer under a nitrogen gas atmosphere, atomized in a molten state, and cooled at cooling rates shown in Table 1 below, so as to prepare iron-based amorphous alloy powder particles according to Examples 1 to 8.

Then, the iron-based amorphous alloy powder particles of Examples 1 to 8 were used to form coating layers 110 having a thickness of 0.3 mm on the surfaces of cast iron brake discs by a high velocity oxygen fuel (HVOF) spray coating method using an apparatus (Oerlikon Metco Diamond Jet series HVOF gas fuel spray system) with oxygen and propane gas as a fuel, and a spray distance of 30 cm. The apparatus and specific conditions used at that time are as follows.

DJ Gun HVOF

[Conditions] Gun type: Hybrid, Air cap: 2701, LPG flow: 160 SCFH, LPG pressure: 90 PSI, Oxygen flow 550: SCFH, Oxygen pressure: 150 PSI, Air flow: 900 SCFH, Air pressure: 100 PSI, Nitrogen flow: 28 SCFH, Nitrogen pressure: 150 PSI, Gun speed: 100 m/min, Gun pitch: 3.0 mm, Feeder rate: 45 g/min, Stand-off distance: 250 mm

TABLE 1

| Components | Example 1 | Example 2 | Example 3 | Example 4 | Example 5 | Example 6 | Example 7 | Example 8 |
|---|---|---|---|---|---|---|---|---|
| Fe (parts by weight) | 100 | 100 | 100 | 100 | 100 | 100 | 100 | 100 |
| Cr (parts by weight) | 55.0 | 26.2 | 35.5 | 35.5 | 29.2 | 37.4 | 90.8 | 32.1 |

TABLE 1-continued

| Components | Example 1 | Example 2 | Example 3 | Example 4 | Example 5 | Example 6 | Example 7 | Example 8 |
|---|---|---|---|---|---|---|---|---|
| Mo (parts by weight) | 84.0 | 36.4 | 64.5 | 64.5 | 50.2 | 41.1 | — | 7.9 |
| C (parts by weight) | 6.0 | — | 9.2 | 9.2 | 8.0 | 5.6 | — | 0.5 |
| B (parts by weight) | — | 4.2 | — | 10.3 | 9.2 | 4.0 | 13.6 | 2.7 |
| Nb (parts by weight) | — | — | — | — | — | — | — | 2.5 |
| Si (parts by weight) | — | — | — | — | — | — | 5.3 | — |
| Cooling rate (degrees/sec) | $10^4$ | $10^4$ | $10^4$ | $10^2$ | $10^2$ | $10^2$ | $10^4$ | $10^3$ |
| Crystallographic state | mainly amorphous | mainly amorphous | mainly amorphous | mainly amorphous | mainly amorphous | mainly amorphous | mainly amorphous | mainly amorphous |
| *Average particle diameter of powder | 31 | 27 | 30 | 33 | 31 | 29 | 32 | 29 |

*D50 (Unit: μm)

COMPARATIVE EXAMPLES

Comparative Examples 1 to 7: Fabrication of Brake Bodies Using Iron-Based Alloy Powder Particles Materials having components and compositions (weight ratio) shown in Table 2 below were supplied into an atomizer under a nitrogen gas atmosphere, atomized in a molten state, and cooled at cooling rates shown in Table 2 so as to prepare iron-based alloy powder particles of Comparative Examples 1 to 7.

Thereafter, coating layers 110 were formed of the iron-based alloy powder particles in the same manner as in the examples described above. Although each of the coating layers 110 had both amorphous and crystalline phases, the coating layers 110 were amorphous coating layers in which the crystalline phase occupied most of the microstructure.

EXPERIMENTAL EXAMPLES

Experimental Example 1: Evaluation of Hardness of Coating Layers

A micro-hardness test was performed on cross-sections of specimens of the coating layers of Examples 3, 4, 6, 7 and 8 and Comparative Examples 1 to 4 by using a HVS-10 digital low load Vickers hardness tester machine, and results thereof are shown in Table 3 below.

TABLE 3

| Examples | area | Test value $HV_{0.2}$ | Average $HV_{0.2}$ |
|---|---|---|---|
| Example 3 | cross-section | 802/754/828/765/710 | 771 |
| Example 4 | cross-section | 898/834/944/848/789 | 862 |
| Example 6 | cross-section | 1304/1139/1097/1194/1139 | 1174 |
| Example 7 | cross-section | 892/788/811/828/843 | 832 |
| Example 8 | cross-section | 910/899/869/937/922 | 907 |

TABLE 2

| Components | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Fe (parts by weight) | 100 | 100 | 100 | 100 | 100 | 100 | 100 |
| Cr (parts by weight) | 56.2 | 71.4 | 55.0 | 19.6 | 20.0 | 71.4 | 41.1 |
| Mo (parts by weight) | 30.0 | 34.5 | 18.3 | 68.6 | 84.7 | 24.5 | 37.4 |
| C (parts by weight) | — | 2.0 | 2.8 | 2.0 | — | 6.0 | 2.8 |
| B (parts by weight) | — | — | 7.3 | 5.9 | 4.1 | — | 5.6 |
| Nb (parts by weight) | — | — | — | — | — | — | — |
| Si (parts by weight) | — | — | — | — | 0.5 | 0.1 | 0.05 |
| Cooling rate (° C./sec) | $10^4$ | $10^4$ | $10^2$ | $10^2$ | $10^4$ | $10^3$ | $10^2$ |
| Crystallographic state | mainly crystalline | mainly crystalline | mainly crystalline | mainly crystalline | mainly crystalline | mainly crystalline | mainly crystalline |
| *Average particle diameter of powder | 5 | 10 | 50 | 50 | 5 | 20 | 50 |

*D50 (Unit: μm)

TABLE 3-continued

| Examples | Test area | Test value HV$_{0.2}$ | Average HV$_{0.2}$ |
|---|---|---|---|
| Comparative Example 1 | cross-section | 669/756/623/689/683 | 684 |
| Comparative Example 2 | cross-section | 928/862/876/921/802 | 877 |
| Comparative Example 3 | cross-section | 828/848/1012/944/771 | 880 |
| Comparative Example 4 | cross-section | 821/855/808/783/633 | 780 |

As shown in Table 3, the average hardness of the cross-section of the specimen formed of the alloy powder of Example 6 was the best, and the other examples resulted in hardness values similar to those by the comparative examples.

Experimental Example 2: Evaluation of Thermal Expansion Coefficients of Coating Layers and Brake Parts Amorphous alloy specimens having the same compositions as those of Examples 6 to 8 and Comparative Examples 1 to 3 were prepared, and the thermal expansion coefficients thereof were measured. The thermal expansion coefficients of coating layers were compared with that of cast iron which is commonly used as a material of a brake part. A reference thermal expansion coefficient of cast iron was 10.2 ppm/° C.

TABLE 4

| Examples | Thermal expansion coefficient (ppm/° C.) | Ratio to thermal expansion coefficient of cast iron (times) |
|---|---|---|
| Example 6 | 12.5 | 1.23 |
| Example 7 | 12.4 | 1.22 |
| Example 8 | 12.5 | 1.23 |
| Comparative Example 1 | 14.6 | 1.43 |
| Comparative Example 2 | 14.6 | 1.43 |
| Comparative Example 3 | 14.4 | 1.41 |

Experimental Example 3: Evaluation of Frictional Force and Wear Resistance of Coating Layers Formed of Alloy Powder Particles For evaluation of frictional force (coefficient of friction), coating layers formed of the same alloy compositions as in Examples 1, 4, 5, 7, and 8, and Comparative Examples 1 to 3 were subjected to a metal ring-lump test under a lubricating oil condition, wear widths were measured. Specifically, the metal ring-lump test was performed using an MR-H3A high-speed ring-lump wear machine with an L-MM46 resistance-friction hydromantic lubricating oil, and test parameters were varied in the order of 50 N, 5 min→100 N, 25 min→1000 N, 55 min.

The measured friction coefficients and wear widths are shown in Tables 5 and 6 below.

TABLE 5

| | 100N, 25 min | | 1000N, 55 min | |
|---|---|---|---|---|
| Examples | Coefficient of friction (μ) | Average coefficient of friction (μ) | Coefficient of friction (μ) | Average coefficient of friction (μ) |
| Example 1 | 0.001~0.007 | 0.0044 | 0.040~0.078 | 0.0692 |
| Example 4 | 0.005~0.024 | 0.0127 | 0.007~0.095 | 0.0860 |
| Example 5 | 0.006~0.028 | 0.0135 | 0.007~0.098 | 0.0882 |
| Example 7 | 0.004~0.026 | 0.0131 | 0.004~0.099 | 0.0879 |
| Example 8 | 0.006~0.031 | 0.0141 | 0.006~0.103 | 0.0896 |
| Comparative Example 1 | 0.030~0.054 | 0.0419 | 0.101~0.119 | 0.1123 |
| Comparative Example 2 | 0.008~0.047 | 0.0196 | 0.088~0.116 | 0.0913 |
| Comparative Example 3 | 0.065~0.087 | 0.0820 | 0.098~0.111 | 0.1085 |

TABLE 6

| Examples | Width/mm |
|---|---|
| Example 1 | 0.79 |
| Example 4 | 0.75 |
| Example 5 | 0.71 |
| Example 7 | 0.68 |
| Example 8 | 0.68 |
| Comparative Example 1 | 0.98 |
| Comparative Example 2 | 1.15 |
| Comparative Example 3 | 0.82 |

Experimental Example 4: Evaluation of Corrosion Resistance of Coating Layers

FIGS. 3A to 3B are optical microscopic images of non-corroded/corroded cross-sections of sprayed coating layer specimens respectively formed of the iron-based amorphous alloy powder particles of Examples 2, 5, and 7 of the present disclosure. FIG. 4A to 4C are optical microscopic images of non-corroded/corroded cross-sections of sprayed coating layer specimens respectively formed of the alloy powder particles of Comparative Examples 5, 6, and 7.

Specifically, after immersing each of the sprayed coating layer specimens in a 95% to 98% sulfuric acid (H$_2$SO$_4$) solution at room temperature for 5 minutes, cross-sections and surfaces of uncorroded coating layer specimens and corroded coating layer specimens were observed using an optical microscope (Leica DM4 M). In FIGS. 3A to 3C and 4A to 4C, the left side shows non-corroded specimens, and the right side shows corroded specimens.

Results of observation showed that when the coating layer specimens of Examples 2, 5, and 7 were used, there was no significant difference in appearance before and after immersion in the sulfuric acid solution as shown in FIGS. 3A to 3C, resulting in high corrosion resistance.

However, when the coating layer specimens of Comparative Examples 5, 6, and 7 were used, as shown in FIG. 4, corrosion occurred severely as shown in FIGS. 4A to 4C, resulting in poor poor corrosion resistance.

This is due to whether the coating layers are amorphous or not. The coating layers of the examples hardly reacted with the strong acid corrosive, but the coating layers of the comparative examples, which has a crystalline phase, reacted with the corrosive and corroded, exhibiting poor corrosion resistance.

The features, structures, effects, etc. described by example in the embodiments above may be combined with each other or modified in other embodiments by those of ordinary skill in the art. Therefore, those combinations and modifications should be interpreted as being included within the scope of the present disclosure.

EXPLANATION OF SYMBOLS

10: BRAKE BODY, 20: FRICTION MEANS
100: BRAKE PART, 110: COATING LAYER
120: ROTOR, 200: COUPLING PART

The invention claimed is:

1. A brake body for a brake device, the brake body comprising:
   a coupling part which is to be connected to a drive shaft; and
   a brake part comprising a rotor connected to an outer peripheral surface of the coupling part, and a coating layer provided on a surface of the rotor,
   wherein the coating layer comprises an amorphous alloy and has a thermal expansion coefficient 1.0 times to 1.4 times a thermal expansion coefficient of the rotor,
   wherein the amorphous alloy comprises:
   Fe;
   a first component comprising at least one selected from the group consisting of Cr, Mo, and Co;
   a second component comprising at one selected from the group consisting of B, C, Si, and Nb, and
   wherein the amorphous alloy includes the first component in an amount of 30 to 140 parts by weight and the second component in an amount of 4 to 20 parts by weight, based on 100 parts by weight of Fe included in the amorphous alloy.

2. The brake body of claim 1, wherein the rotor comprises an iron-based alloy.

3. The brake body of claim 1, wherein the coating layer has an average friction coefficient of 0.001 to 0.08 when measured under a condition of 100 N.

4. The brake body of claim 1, wherein the coating layer has a Vickers hardness of 700 Hv to 1,200 Hv.

5. The brake body of claim 1, wherein the coating layer has a porosity of 0.1% to 1.0%.

6. The brake body of claim 1, wherein the coating layer has a thickness of 50 μm to 400 μm.

7. The brake body of claim 1, wherein the coating layer is provided by spraying iron-based amorphous alloy powder onto the surface of the rotor.

8. The brake body of claim 1, wherein the rotor is shaped like a disc, and the coating layer is provided on at least one surface of the disc.

9. The brake body of claim 1, wherein the rotor has a drum shape, and the coating layer is provided on an inner peripheral surface of the rotor.

10. A brake device for braking a machine which includes a drive shaft and is driven, the brake device comprising:
    a brake body that comprises a coupling part coupled to the drive shaft and rotated when driven, and a brake part connected to an outer peripheral surface of the coupling part; and
    a friction means that is displaced toward the brake body, brought into contact with the brake body, and contacted with the brake part for braking,
    wherein the brake part comprises a rotor connected to the coupling part and a coating layer provided on a surface of the rotor,
    wherein a thermal expansion coefficient of the coating layer is 1.0 times to 1.4 times a thermal expansion coefficient of the rotor, and the coating layer comprises an amorphous alloy,
    wherein the amorphous alloy comprises:
    Fe;
    a first component comprising at least one selected from the group consisting of Cr, Mo, and Co; and
    a second component comprising at least one selected from the group consisting of B, C, Si, and Nb, and
    wherein the amorphous alloy includes the first component in an amount of 30 to 140 parts by weight and the second component in an amount of 4 to 20 parts by weight based on 100 parts by weight of Fe included in the amorphous alloy.

11. The brake device of claim 10, wherein the rotor comprises an iron-based alloy.

12. The brake device of claim 11, wherein the rotor has a disc shape, and the coating layer is provided on at least one surface of the rotor.

13. The brake device of claim 11, wherein the rotor has a drum shape, and the coating layer is provided on an inner peripheral surface of the rotor.